United States Patent [19]

Griffin et al.

[11] Patent Number: 4,696,706

[45] Date of Patent: Sep. 29, 1987

[54] METHOD OF USING LOGIC DESIGN ADHESIVE SYMBOLS

[76] Inventors: Kevin W. Griffin, 4085 Dianthus La., Titusville, Fla. 32796; Robert P. Mallette, 119 E. Leon La., Cocoa Beach, Fla. 32931

[21] Appl. No.: 793,135

[22] Filed: Oct. 31, 1985

[51] Int. Cl.[4] .............................................. B32B 31/12

[52] U.S. Cl. ....................................... 156/62; 40/2 R; 40/360; 156/249; 156/344; 221/1; 428/42; 428/79; 434/85

[58] Field of Search ................... 40/2 R, 360; 156/62, 156/247, 249, 344; 283/81; 428/42, 79; 434/85; 221/1

[56] References Cited

U.S. PATENT DOCUMENTS

| | | | |
|---|---|---|---|
| 2,213,666 | 9/1940 | Burke | 40/2 R X |
| 4,244,125 | 1/1981 | Corey | 40/2 R |

*Primary Examiner*—Robert A. Dawson

[57] ABSTRACT

A logic design aid is produced by the use of distinct self-adhesive logic symbols. The logic symbols are applied to a firm dispenser board with a predetermined location. The dispenser board has a sticky material that allows the logic symbols and dispenser board to be orientated in any configuration in space. The distinct logic symbols are designed so that they can be easily removed without damage to the surface and reapplied to another position. The surface of each logic symbol has a blank area to allow text description to be entered to identify the logic process. The logic symbols are well suited for computer program flowchart development and electronic circuit design drawings.

11 Claims, 7 Drawing Figures

METHOD OF USING LOGIC DESIGN ADHESIVE SYMBOLS

BACKGROUND OF THE INVENTION

1. Field of the Invention

This invention generally relates to adhesive symbols, and more particularly to data processing flowchart adhesive symbols, for use in computer programming.

2. Background Discussion

Presently, computer programmers use a standard computer flowchart template to draw the logic flow of a computer program. In this method, a flowchart template with an appropriate symbol to be used, is placed over a writing surface and a distinct logic symbol is traced with a writing instrument to represent the particular logic step of the program. The programmer then proceeds to the next step in the program, traces another logic symbol, connects the two logic symbols with a flow arrow and writes in the symbol for the logic step description. This is repeated until the computer programmer finishes all the logic flow of the program. This is often a tedious and time-consuming method of displaying a computer program logic block.

Another problem that arises is when there is a "bug" or error found in the program. When this happens, the computer programmer has to refer to the flowchart to determine the error in the program. The error often relates to an error in the logic of the program. When this type of error is encountered, it is easier to "debug" and correct the logic in the flowchart rather than make corrections in the logic in the complex program source code. If the flowchart has been written into a tangible form, considerable effort can be expended in erasing, rearranging and redrawing the logic flow diagram (flowchart).

Often errors in computer programs will go undiscovered for long periods of time. Under these circumstances, the flowchart may be written in a permanent form. Thus, the computer programmer may have to redraw the entire flowchart. This can involve needless manhours and be a considerable expense for a computer user.

After using a computer program for a period of time, the computer program user may desire to modify the program. This may not be the task of the original computer programmer. A new computer programmer, assigned to modify the program, can quickly and easily understand the logic of the program by consulting the flowchart. However, after using the program for such a long time, the flowchart will usually be in a permanent form, and the new computer programmer must be able to modify the flowchart to determine if the modifications necessary are logically compatible with the original program. The easier the computer programmer can modify, reorganize and redraw a flowchart means less effort used in manhours and less expense for computer users. For major computer users, this could be a considerable economic factor.

Patents which are of interest are: U.S. Pat. No. 3,421,239 to J. L. Smith granted Jan. 14, 1969; U.S. Pat. No. 4,235,459 to Callahan granted Nov. 25, 1980; U.S. Pat. No. 4,250,642 granted to Riehle granted Feb. 17, 1981 and U.S. Pat. No. 4,156,539 granted May 29, 1979.

It is an object of the present invention to eliminate the redrawing of a logic flow by providing a computer programmer or logic designer with adhesive-backed symbols having distinct geometric shapes representing a programming process or logic flow.

It is another object of the present invention to provide a writing surface on the face of the adhesive-backed logic symbols.

It is a further object to allow the adhesive logic symbols to be quickly and easily peeled off and relocated in another location without damaging the object to which it was first attached.

It is still another object of the present invention to provide a logic designer a simple and flexible method of developing logic designs by applying and removing adhesive logic symbols while still maintaining a neat original appearance of the logic design surface.

SUMMARY OF THE INVENTION

This invention relates to data processing flowchart adhesive symbols designed to provide the computer programmer or the logic designer a simple method of quickly and rapidly developing logic flowcharts or logic designs. The distinct adhesive logic symbols are designed with a sticky-backed material which will allow the symbols to be placed temporarily or permanently on most semi-smooth receiving materials, such as paper, walls, etc. This will provide the computer programmer or logic designer the flexibility to quickly modify or delete portions of the logic design as required without the necessity of erasing or rewriting. The distinct adhesive logic symbols have a dark outlined edge on them so that the symbols can be easily identified on originals and reproductions. Within the center of the symbols, a blank area is provided to allow text descriptions to be entered to identify the logic process. In addition, each symbol will have a distinct geometric shape corresponging to the logic representation used in logic design layouts.

All of the distinct logic symbols will be backed with a homogeneous adhesive layer with a protective removable coating and applied to a special dispenser board with predetermined locations. The distinct adhesive logic symbols are designed such that the computer programmer can quickly remove the symbols with ease from the dispenser board, remove the protective strip with parting material, and apply with pressure the logic symbol to an object. The homogeneous layer also allows the logic symbol to be removed from the receiving material and be repositioned without damaging the receiving material. On the front of the dispenser board will be part numbers and symbol configuration samples so that the logic symbols can be replenished as needed. In addition, refills of any logic symbol can be reapplied to the board. The refills of logic symbol (logic symbol pad) contain a plurality of symbols to facilitate the production of a logic flow of a computer program or logic diagram. The logic symbol pad has a sticky edge to hold a plurality of symbols of one type together. The logic symbols can be peeled apart separately and used.

In another embodiment, the protective removable coating is not used, when an appropriate adhesive is used. This adhesive would have the properties of allowing the logic symbols to be easily removed and pressed into place without a protective coating and without damage to the surface from which the logic symbol was removed.

DESCRIPTION OF AN ILLUSTRATIVE EMBODIMENT

Figure 1:
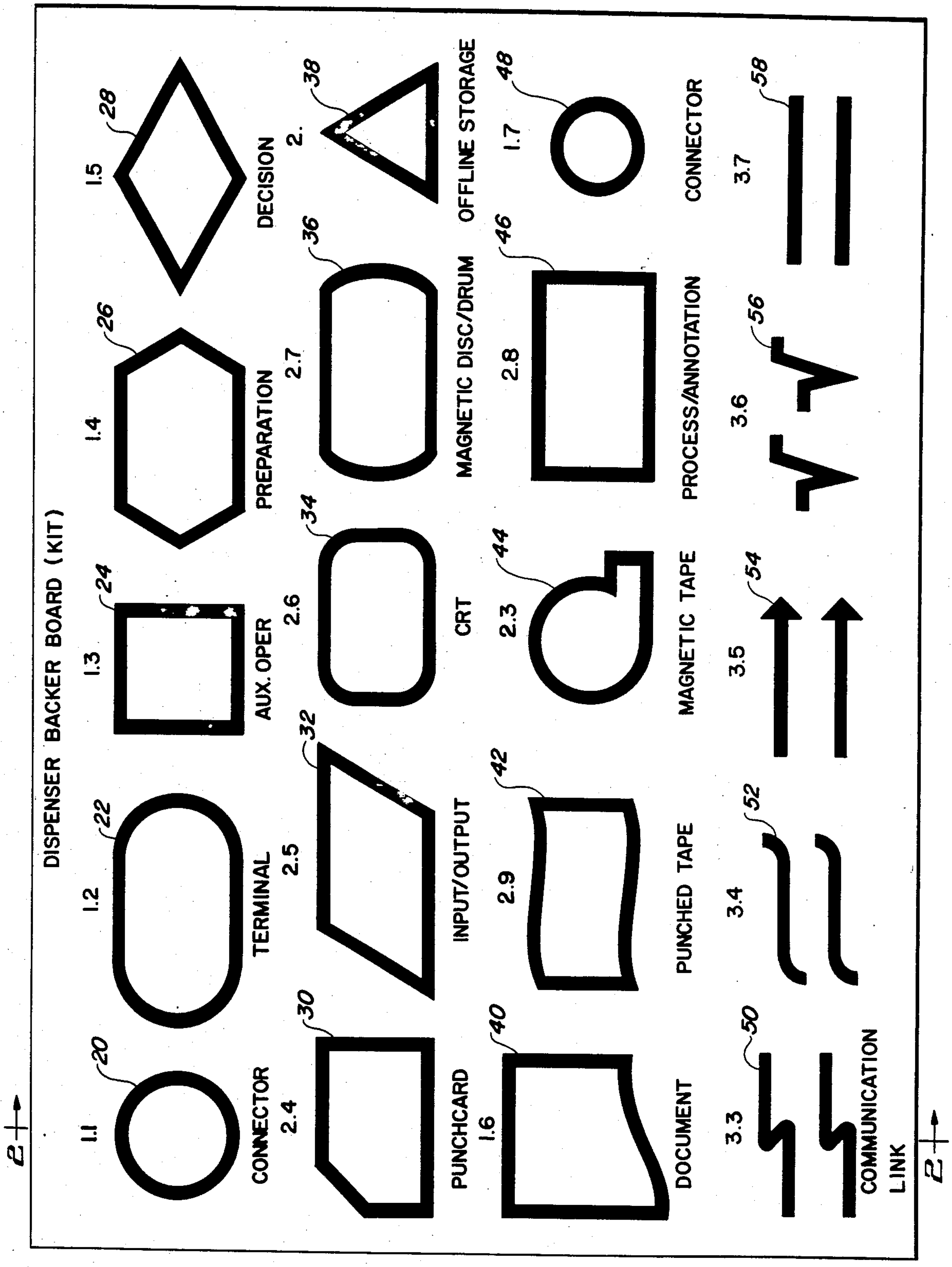
FIG. 1 is a plane view of the logic symbols on the symbol dispenser board.

FIG. 1 illustrates the component parts of the data processing flowchart symbol device of one embodiment of the present invention. The flat dispenser board 10 contains the distinct data processing flowchart logic symbols 20 through 58. These distinct logic symbols are used in the preparation of data processing flowchart documentation.

The connector logic symbol 20 represents a junction in the line of flow. The process logic symbol 46 represents the process of executing a defined operation or group of operations in a computer program. The logic symbol 32 represents input/output for making available information for processing or recording processed information. The logic symbol 40 is the document symbol. It represents the input/output function in which the medium is a document.

The preparation logic symbol 26 represents a group of instructions which modify, update, correct or otherwise change the computer program. The decision logic symbol 28 represents points in which a program may change paths where possible, based upon variable conditions. The magnetic tape logic symbol 44 is the input/output function in which the medium is magnetic tape. The CRT logic symbol 34 is the input/output function in which the information is displayed for human use at time of processing. The auxiliary operation logic symbol 24 defines offline operations performed on equipment not under direct control of the central processor.

The offline storage 38 is the storage of information of data. The terminal interrupt logic symbol 22 represents a point at which information can enter or leave. The punched card logic symbol 30 represents the input/output function in which the medium is punched cards including marked sense cards and stub cards. The punched tape logic symbol 42 is the input/output function in which the medium is punched tape. The magnetic drum/magnetic disc logic symbol 36 represents the input/output function in which the medium is magnetic drum or magnetic disc.

The connector logic symbol 48 is a larger version of logic symbol 20. The arrow head logic symbol 54 represents the direction of the flow in the flowchart. The communication link logic symbol 50 represents a communication link with an external device not on site with the local computer. The logic symbol 52 represents a flow which is similar in operation. The square root symbol 50 represents the square root of a number. The line logic symbol 58 can be used to connect logic symbol.

These logic symbols can be quickly removed and used by a computer programmer to construct a flowchart in any fashion the computer programmer decides. Because of these symbols, the computer programmer does not have to use the standard computer flowchart template to draw the logic flow of the computer application. These logic symbols can be removed and reapplied to the flowchart or any semi-smooth surface in any fashion.

The distinct adhesive logic symbols have a dark outlined edge 19 so that the logic symbols can be easily identified on originals and reproductions. In addition, the surface of the logic symbols 20-58 can be written on to document the type of logic that occurs at each step. For instance, the process logic symbol can contain text to signify the process that is being represented by the presence of this symbol. To facilitate the carrying of the dispenser board and the logic symbols in a notebook, three pre-cut, easily removable holes are provided for three-ring notebooks.

Figure 2:
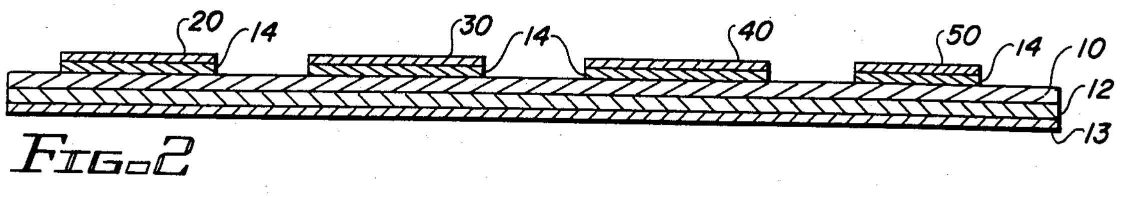
FIG. 2 is an enlarged vertical cross-section view taken substantially on the line 2—2 of FIG. 1.

Referring now to FIG. 2, FIG. 2 represents an enlarged vertical cross-section view taken substantially on the line 2—2 of FIG. 1 of only one logic symbol (for clarity) attached to the dispenser board. On the back of the dispenser board 10 is a layer of sticky material 12. The sticky material 12 allows the dispenser board 10 with the logic symbols 20 to 58 to be mounted on a chalk board, wall or any smooth surface.

The layer does not have to cover the entire dispenser board, but it has to cover enough to allow the dispenser board and symbols to be firmly attached to an object in any configuration. In addition, the dispenser board is firm enough to withstand repeated removing and reapplying of logic symbols and retain its flat shape. Further, there is a protective layer 13 for preventing the dispenser board 10 from being prematurely or accidently attached to an object.

The connector symbol is represented by the numeral 20. The top surface of 20 is a writing surface. The bottom surface has a layer of sticky material 14 which secures 20 to the dispenser board 10. The adhesive 14 is strong enough to retain the logic symbol 20 to the dispenser board, but yet allows 20 to be easily peeled off from the dispenser board without damaging the surface of the dispenser board. The punch card logic symbol 30 is also shown with an adhesive layer 14 for securing it to the dispenser board and allowing it to be easily removed. The document logic symbol 40 is shown also with an adhesive layer 14 which allows it to be secured to the dispenser board 10 and easily removed. The communication link logic symbol 50 is also shown with an adhesive layer 14 which again allows it to be easily removed and stuck to another surface. All of the logic symbols 20 through 58 have the same adhesive layer 14 in the shape of the same geometric design of a logic symbol which allows any logic symbol to be easily removed from the dispenser board and secured to another object. The adhesive 14 is strong enough to secure any distinct logic symbol to an object and yet let the logic symbol be removed without damage to the object.

Figure 3:
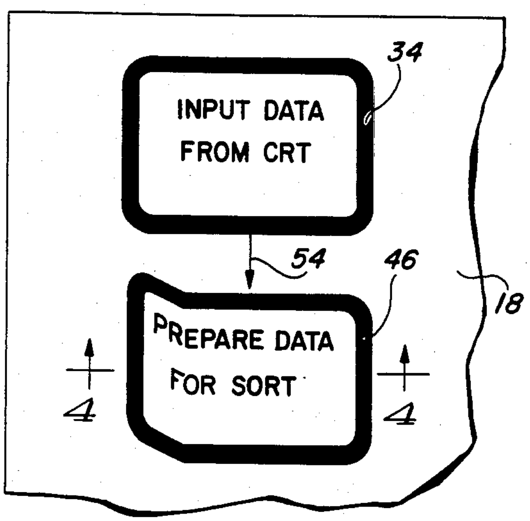
FIG. 3 illustrates the use of the logic symbols of the present invention.

Referring to FIG. 3, there is shown the CRT input logic symbol 34 associated with the process logic symbol 20 secured to a surface 18. FIG. 3 depicts the usage of the logic symbols in a logic design.

The distinct logic symbol 34 is easily removed from the dispenser board 10 with the fingers. The adhesive layer 14 remains intact with the logic symbol 34. The logic symbol is then pressed into the desired position with the fingers, where the adhesive layer firmly attaches the logic symbol 34 to the semi-smooth surface 18. The surface 18 has to be nonporous enough to provide enough surface area for the adhesive layer to adhere to the surface. The adhesive layer 14 is sticky enough to maintain the position of the logic symbol, but not so sticky as to damage the dispenser board of the sheet 18 upon the removal of the logic symbol. The CRT input logic symbol has been written on to represent a particular chosen logic function, the input data from a keyboard.

The logic then flows down through arrow head connector 54 to the process block 46. The connector 54 and the process data block 46 have been removed from the dispenser board and pressed on the sheet 18 to secure them in place just as the CRT input logic symbol 34. The process logic symbol 46 is shown in the process of being removed so that another logic symbol can be put in its place. It is important to note that the removal of the logic symbol 46 does not damage the original surface 18. The logic symbol 46 is easily removed and reapplied to a different position or discarded.

Figure 4:
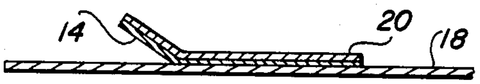
FIG. 4 is an enlarged vertical cross-section view taken substantially on the line of 4—4 of FIG. 3.

Referring to FIG. 4, FIG. 4 illustrates line 4—4 of FIG. 3. The process logic symbol 46 is being removed from the surface 18. The adhesive layer symbol 14 secures the process logic symbol 46 to the surface 18. Upon removal of the process logic symbol 46 from the surface 18, the adhesive symbol 14 remains securely fastened to the process logic symbol 20. Thus, the process logic symbol 46 can be reapplied in another position on the surface 18 or on another object. Upon removal of the process logic symbol 46, surface 18 remains undamaged and unmarked.

Figure 5:
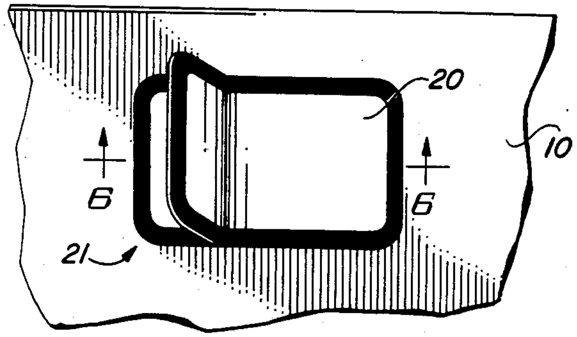
FIG. 5 illustrates a refill cluster of one distinct logic symbol.

Referring to FIG. 5, FIG. 5 represents a cluster or plurality of process logic symbols 21. The top logic symbol 46 is shown being removed from the rest of the cluster. The logic symbols can be provided in a cluster of logic symbols, so that a logic designer can use a plurality of logic symbols of the same geometric shape. The cluster of logic symbols has the same size, shape and configuration as each individual logic symbol and are used in the same position on the dispenser board. The removal of one logic symbol from a cluster is easily accomplished with the use of the fingers.

Figure 6:
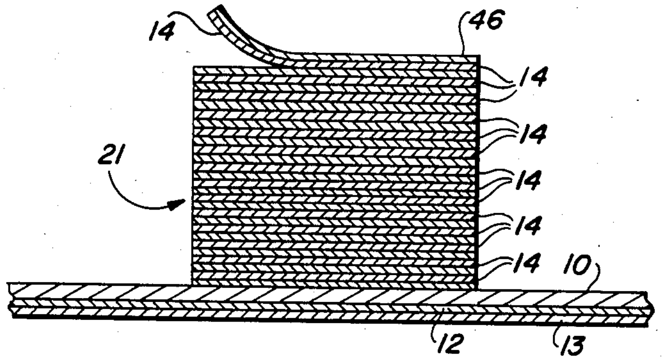
FIG. 6 is an enlarged detail view taken substantially on the line 6—6 of FIG. 5.

Referring to FIG. 6, there is shown line 6—6 of FIG. 5. It shows the removal of the process logic symbol block 21 from a cluster of process logic symbol blocks 46. Each logic symbol has an adhesive layer 14 attached to the back. The top of the process logic symbol is a writable surface to hold information and text. Upon the removal of the process logic symbol 46, the adhesive layer 14 allows the easy removal of the process logic symbol of the top process logic symbol from the rest of the cluster, the rest of the cluster remaining intact and secure to the dispenser board 10. Note that the adhesive layer 14 is sticky enough to allow a stacking of the logic symbols to an appropriate number useful for the development of a logic design. The adhesive layer 12 securely fastens the cluster to the dispenser board 10 when the dispenser board is in any configuration, and securely fastens the dispenser board 10 and the cluster of logic symbols to any object such as a wall, desk, or chalk board. The adhesive layer 12 is strong enough to secure the dispenser board 10 and a cluster for each symbol of 20 through 72 in any orientation in space, and retains the dispenser board 10 with the cluster of logic symbols attached thereto even upon the removal of a single logic symbol.

In this way, the dispenser board 10 can support a number of cluster logic symbols. The adhesive layer 14 on the back of each symbol is strong enough to secure the logic symbol to an appropriate surface, but weak enough to allow the removal of the symbol from the surface without any tearing, damage or disconfiguration to the surface. The adhesive layer 14 is strong enough to allow a cluster of symbols to be secured to the dispenser board 10 when the dispenser board 10 is in any configuration or orientation in space. Thus, the dispenser board can be attached to a wall with clusters of symbols attached to the dispenser board on the wall, such that the cluster assemblies are securely fastened to the dispenser board and do not depart from the dispenser board unless physically removed by an external force, such as the use of the fingers. The adhesive layer, however, keeps the clusters in place during minor environmental forces such as a breeze, air conditioning, and the like.

Figure 7:
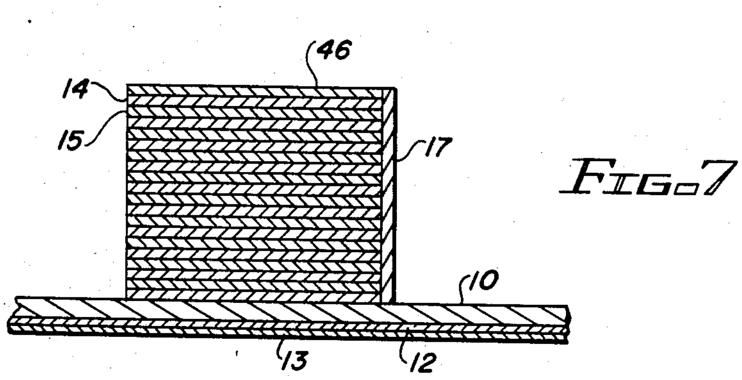
FIG. 7 illustrates another embodiment of the present invention.

Referring to FIG. 7, another embodiment of the present invention is shown. In this embodiment, the logic symbols are provided with a pressure sensitive adhesive 14 on the back thereof initially covered with a removable paper shield 15. Shown is a plurality of process logic symbols (pad) 46 with an adhesive layer 14 and a removable paper shield 15. In use, the user removes a logic symbol and discards the removable paper shield 15 and adhesively secures the remaining logic symbol with adhesive layer to an object. The plurality of logic symbols are held on the dispenser board by removing the paper shield of the bottom logic symbol and sticking the logic pad to the dispenser board. The plurality of logic symbols are held firmly together on the dispenser board by a thin adhesive strip 17 along the side of the logic symbol pad. Thus, a logic symbol can be easily removed from the pad, while the remaining logic symbols remain intact and in place.

While the present invention has been described in terms of flowchart symbols for computer programs, it will be apparent to those skilled in the art that the present invention could very easily be used for an electronic circuit design. Instead of computer flowchart symbols, the logic symbols are electronic circuit symbols such as inverters, gates, etc. These logic symbols are well adapted to the planning and designing of an electronic logic circuit design. In addition, it is apparent that the firmness of the logic symbols could vary, depending upon the circumstances. It may be necessary to use rather large, firm logic symbols on a blackboard for educational purposes or for a large exhibit purpose. These logic symbols are rigid enough to support themselves in any orientation and allow writing on the surfaces without distortion to their surface or distinct shape. Therefore, it will be apparent from the foregoing description that the invention is susceptible to a variety of modifications and changes without, however, departing from the scope and spirit of the appended claims.

What is claimed is:

1. A method of preparing a functional logic diagram comprising the steps of:

(a) providing a plurality of distinct logic symbols, some of said logic symbols having different shapes corresponding to distinctly different logic functions, each logic symbol having a writing surface and an adhesive backing to allow all of the distinct logic symbols to be secured to a surface;

(b) storing the plurality of distinct logic symbols in a dispensing means;

(c) selecting from the plurality of distinct logic symbols, a logic symbol corresponding to a chosen logic function;

(d) removing from the dispensing means the selected distinct logic symbol; and (e) attaching the selected distinct logic symbol in a position corresponding to the chosen logic function.

2. The method recited in claim 1 further comprising the step of writing upon said writing surface of said selected logic symbol.

3. The method recited in claim 2 further comprising the steps of removing said selected logic symbol from said attaching position and replacing said selected logic symbol with another logic symbol from said plurality of distinct logic symbols.

4. The method recited in claim 3 further comprising the step of writing upon said writing surface of said another logic symbol after said replacing step.

5. A method for rapidly placing or replacing individual logic symbols in a logic diagram for a complex computer program or the like having a large number of logic symbols arranged on a surface, said method comprising the steps of:

(a) providing a plurality of removable logic symbols, each removable symbol having a writing face and means for removably adhering each said removable symbol to said surface, said removable symbols having a variety of configurations corresponding to the logic symbols desired to be arranged on said surface;

(b) identifying a desired logic symbol to be arranged at a particular location on said surface;

(c) selecting one of said removable logic symbols corresponding to identified logic symbol;

(d) adhering said selected removable logic symbol at said particular location on said surface; and thereafter (e) writing upon said face of said selected removable logic symbol.

6. The method recited in claim 5 further comprising the steps of:

removing said selected one of said logic symbols from said particular location; and thereafter placing another logic symbol with a configuration different from that of said selected one of said logic symbols on said particular location so as to create a modified logic diagram.

7. The method recited in claim 6 further comprising the step of reusing said selected one of said logic symbols after said removal step.

8. A method for rapidly placing or replacing individual logic symbols in a logic diagram for a complex computer program or the like having a large number of logic symbols arranged on a surface, said method comprising the steps of:

providing a plurality of removable logic symbols, each removable symbol having means for removably adhering each said removable symbol to said surface, said removable symbols having a variety of different geometric configurations, each different geometric configuration corresponding to a particular logic symbol designed to be arranged on said surface;

identifying and selecting a first logic symbol;

adhering said identified and selected first logic symbol at a first location on said surface;

identifying and selecting a second logic symbol having a geometric configuration different from that of said first logic symbol; and adhering said identified and selected second logic symbol at a second location on said surface.

9. The method recited in claim 8 further comprising the steps of:

removing either of said first or second logic symbols from the corresponding one of said first or second locations on said surface; and thereafter replacing the removed one of said first or second logic symbols with a third one of said logic symbols having a geometric configuration different from either said first or second logic symbols so as to create a modified logic diagram.

10. The method recited in claim 6 further comprising the step of reusing said removed one of said first or second logic symbols after said removal step.

11. A method for rapidly placing or replacing individual logic symbols in a logic diagram for a complex computer program having a large number of logic symbols arranged on a surface, said method comprising the steps of:

providing removable logic symbols each having means for removably adhering each of said removable symbols to said surface, said removable symbols having geometric configurations corresponding to connector, terminal, auxiliary operator, preparation, decision, punch card, input/output, CRT, magnetic disk/drum, off line storage, document, punched tape, magnetic tape, process/annotation connector and communication link logic symbols desired to be arranged on said surface;

adhering a multiplicity of said different logic symbols to different locations on said surface; and thereafter removing selected ones of said adhered logic symbols from the corresponding locations on said surface and replacing said removed ones of said logic symbols with logic symbols of different configurations so as to create a modified logic diagram.

* * * * *